United States Patent [19]

Neyret

[11] Patent Number: 4,902,178

[45] Date of Patent: Feb. 20, 1990

[54] RAPID FIXATION DEVICE

[76] Inventor: Guy Neyret, 11, rue du Fort, 69340 Francheville, France

[21] Appl. No.: 264,362

[22] Filed: Oct. 31, 1988

[30] Foreign Application Priority Data

Nov. 6, 1987 [FR] France ................................ 87 15745
Nov. 6, 1987 [FR] France ................................ 87 15746

[51] Int. Cl.⁴ ........................... B23C 5/26; B23B 31/00
[52] U.S. Cl. ....................................... 409/234; 279/86; 408/239 R
[58] Field of Search ................ 409/232, 234, 233; 408/239 R, 239 A; 279/1 A, 86, 82, 79, 80, 76, 85, 89; 403/328, 324, 325

[56] References Cited

U.S. PATENT DOCUMENTS 3,684,303  8/1972  Serra ..................................... 279/82
4,715,753 12/1987  Tack ..................................... 409/234
4,740,122  4/1988  Glaser ................................... 409/232
4,772,163  9/1988  Scheer et al. .......................... 409/232

FOREIGN PATENT DOCUMENTS 1477376  1/1969  Fed. Rep. of Germany ........ 279/86
2526902 12/1976  Fed. Rep. of Germany ...... 409/232
1397195  5/1988  U.S.S.R. .............................. 409/234

Primary Examiner—William Briggs
Attorney, Agent, or Firm—Young & Thompson

[57] ABSTRACT

A rapid securement device for a tool or workpiece holder, comprising an elongated stem, and an elongated axle extending through the stem for axial movement relative to the stem. The stem has a head thereon, the head having a hole therethrough that registers with holes through the stem. A peg for holding a tool or a workpiece holder extends through the holes and has a flat surface that engages with a flat surface on the head. A spring urges the axle in a direction relative to the stem to engage the flat surfaces forcibly together thereby releasably to retain the peg in the holes.

7 Claims, 2 Drawing Sheets

RAPID FIXATION DEVICE

FIELD OF THE INVENTION

The invention relates to a rapid fixation device for a tool or for a workpiece holder allowing a rapid change and a repositioning without adjustment, thereby achieving a great flexibility and a high adaptation rapidity, as well as to a jack with integrated guiding using such a device.

The fixation device according to the invention is characterized by the fact that it includes a tie rod subjected to a high charge and a peg effecting an excentric movement and provided with a disengagement flat surface. Preferably, a second flat surface angularly offset with respect to the disengagement flat surface ensures a stable fixation position. The suppression of the charge on the mechanism or on the tool allows an easy dismantling by extracting the peg, the reassembly being carried out by a reverse operation.

When a jack has to actuate a mechanism while being well guided, one has to provide for a guiding auxiliary device due to the play of the jack stem and to its small diameter. Such an auxiliary guiding device, which can be constituted by columns, rails, balls or rollers, slides, etc., necessitates a flexible connection with the jack in order to avoid the effects of a misalignment. Such an assembly is costly, complex and bulky, and its setting in position is time consuming.

OBJECTS AND SUMMARY OF THE INVENTION

The object of the present invention is to provide a new jack including its own integrated precision guiding device, which can be very simply and quickly put in operation, while being economical, robust and compact.

To this effect, the jack according to invention is characterized by the fact that its stem is constituted by a precision-ground column with a diameter more than the two thirds of the piston diameter and which slides in a fixed guiding ring, said jack including rotation stopping means for the stem or for the tool mounted on the stem. The column which acts a jack stem presents a suitable rigidity and affords a guiding such that it allows consequently eliminating any auxiliary guiding system.

In an embodiment, said means are provided by a transverse peg coacting with a groove of a guide. Advantageously, said guide includes proximity detection means for the peg in at least one position of the guiding groove, said means forming an end of stroke detection system of the stem.

BRIEF DESCRIPTION OF DRAWINGS

The invention will be better understood from the reading of the following description with reference to the accompanying drawings wherein.

DETAILED DESCRIPTION OF THE INVENTION

Figure 1:
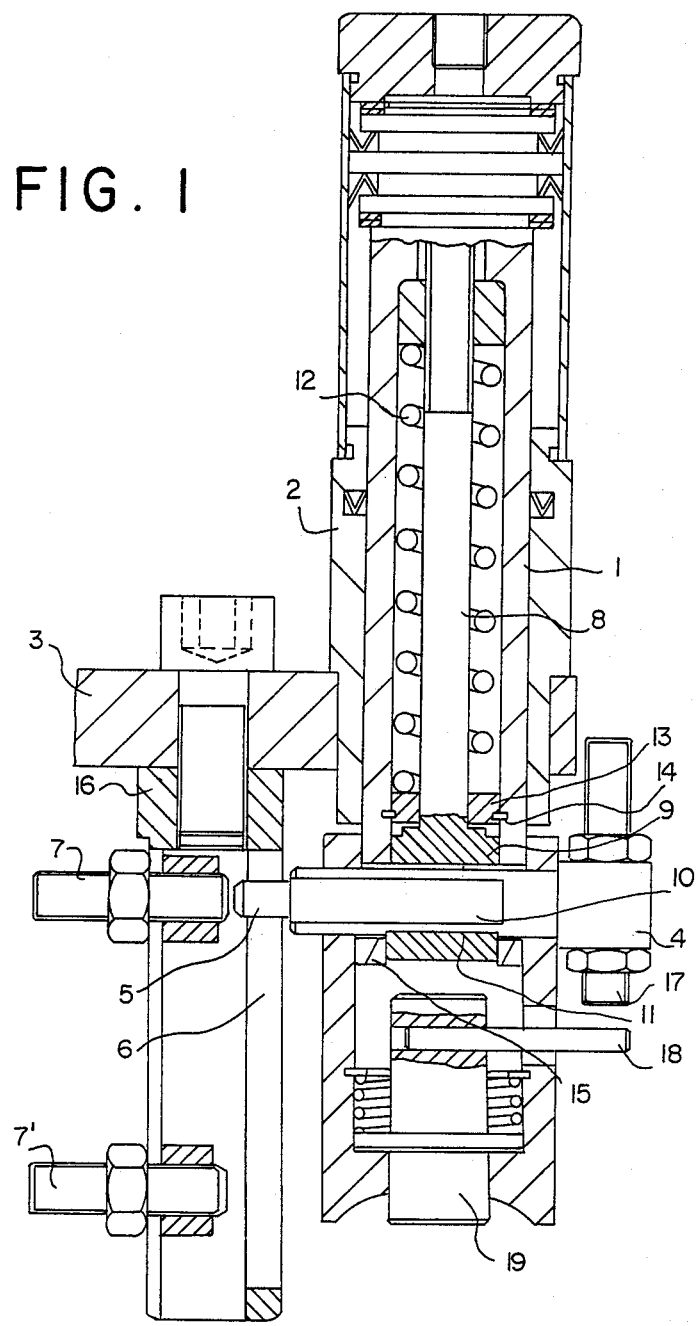
FIG. 1 is an axial sectional view, partly in elevation, of a portion of a jack provided with a rapid fixation device according to the invention.

Reference is first made to FIG. 1.

The jack includes a stem 1 sliding in a guiding ring 2 rigidly connected to a frame 3. A tool mounted on stem 1 is provided with a transverse peg 4 the point 5 of which slides inside a groove 6 of guide 7, in order to prevent a rotation of stem 1.

According to the invention, stem 1 includes an inner axle 8 through the head 9 of which extends peg 4. Said peg 4 includes a disengagement flat surface 10 and a second flat surface 11, narrower, oriented at 90° with respect to flat surface 10, serving to ensure the accurate and stable positioning of peg 4. Axle 8 is surrounded by a helical spring 12 bearing on a ring 13 which is in turn stopped by an abutment 14. The other end of axle 8 is rigidly connected to the other end of spring 12. Head 9 of axle 8 is in register with a hollow 15 inside stem 1, allowing a certain amount of axial play of axle 8, against the action of spring 12. By partly compressing spring 12, one can thus free peg 4 and easily change the mechanism or the tool.

This system, which includes a tie rod highly charged (of the order of 100 kg for example) and an axle with an excentric movement, can be used in a general manner for the rapid fixation in a stable position of any tool or workpiece holder in a machine, thereby providing a great adaptation flexibility to various types of workpieces for example.

A captor 17 of the inductive type is placed in a bore of the head of peg 4 and cooperates with a workpiece feeler 19 and 18 in the tool. Thus is detected the presence or absence of a workpiece in the tool, as well as possibly the positioning of the workpiece, without having a feeler in the tool as such. Thereby it is unnecessary to connect and set the feeler whenever a tool is being changed.

Moreover, guide 16 carries two captors 7, 7' cooperating with the point 5 of peg 4 in order to detect the jack stroke ends. Captors 7, 7' can be replaced by end of stroke switches.

Thus, peg 4 fulfills as such a fourfold role:
a rapid fixation of the tool or of the mechanism.
a detection of the stroke ends of the mechanism or tool.
a detection of the presence or absence of the workpiece, and possibly of its right positioning.
an anti-rotation of the mechanism or tool.

Figure 2:
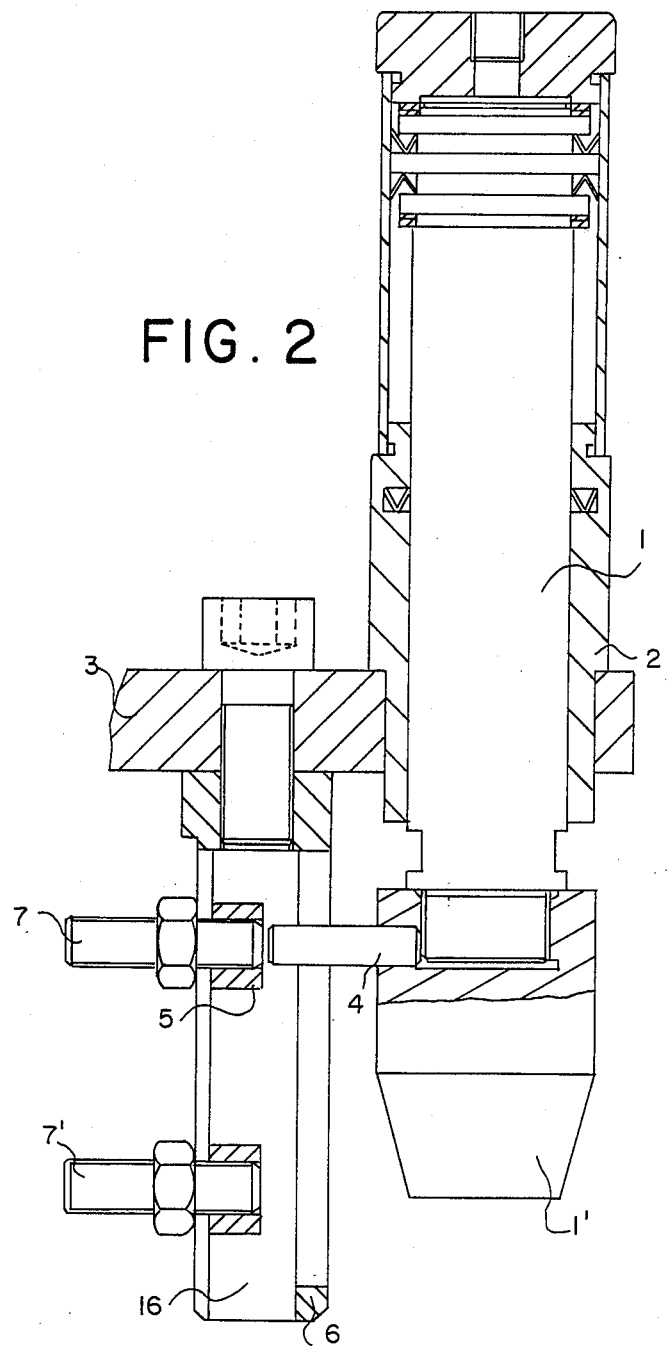
FIG. 2 is a schematic elevation view of a jack with an integrated guiding system according to an embodiment of the invention.

Reference is now made to FIG. 2 showing the jack in more detail. According to the invention, the jack includes a stem 1 formed of a precision-ground column having a diameter more than two thirds of the diameter of the piston and which slides inside a guiding ring 2 rigidly connected to a frame 3. The tool 1' mounted on stem 1 is provided with a transverse peg 4 the point 5 of which slides inside a vertical groove 6 of guide 16, so as to preclude the rotation of stem 1. Guide 16 carries two captors 7 and 7' cooperating with point 5 of peg 4 in order to detect the stroke ends of the jack.

I claim:
1. A rapid securement device for a tool or workpiece holder, comprising an elongated stem, an elongated axle extending through said stem for axial movement relative to the stem, the axle having a head thereon, said head having a hole therethrough that registers with holes through said stem, a peg for holding a tool or a workpiece holder, said peg extending through said holes and having a flat surface that engages with a flat surface on said head, and spring means urging said axle in a direction relative to said stem to engage said flat surfaces forcibly together thereby releasably to retain said peg in said holes.

2. A device according to claim 1, said peg having a second flat surface angularly offset with respect to the first-mentioned flat surface and bearing against an adjacent further flat surface of said device for accurately and stably positioning said peg.

3. A device according to claim 1, said flat surface being recessed in said peg and said peg having clearance relative to said hole in said head thereby to permit movement of said head transversely to said peg to permit said flat surface on said head to move toward and away from said recessed flat surface on said peg.

4. A device according to claim 1, and means defining a fixed groove in which an end of said peg slides to prevent rotation of said stem.

5. A device according to claim 1, and at least one position detector for detecting the position of an end of said peg.

6. A device according to claim 1, said peg having a bore therethrough in which is disposed a captor of the inductive type.

7. A device according to claim 1, in which said stem constitutes the piston of a jack and slides in a fixed guiding ring.

* * * * *